(12) United States Patent
Teufel

(10) Patent No.: US 11,318,824 B2
(45) Date of Patent: May 3, 2022

(54) ASSEMBLY FOR A COVER OF A VEHICLE ROOF, AND VEHICLE ROOF FOR A MOTOR VEHICLE

(71) Applicant: Webasto SE, Stockdorf (DE)

(72) Inventor: Ingo Teufel, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 17/055,868

(22) PCT Filed: Jun. 4, 2019

(86) PCT No.: PCT/EP2019/064492
§ 371 (c)(1),
(2) Date: Nov. 16, 2020

(87) PCT Pub. No.: WO2019/238470
PCT Pub. Date: Dec. 19, 2019

(65) Prior Publication Data
US 2021/0245589 A1    Aug. 12, 2021

(30) Foreign Application Priority Data

Jun. 12, 2018  (DE) .................... 10 2018 113 991.8

(51) Int. Cl.
*B60J 7/043*  (2006.01)
*B60J 7/02*  (2006.01)
(Continued)

(52) U.S. Cl.
CPC ............. *B60J 7/0435* (2013.01); *B60J 7/024* (2013.01); *B60J 7/1856* (2013.01); *B60J 7/19* (2013.01); *B60J 7/192* (2013.01)

(58) Field of Classification Search
CPC ... B60J 7/0435; B60J 7/024; B60J 7/05; B60J 7/022; B60J 7/043; B60J 7/057; B60J 7/192; B60J 7/1856; B60J 7/19
(Continued)

(56) References Cited

U.S. PATENT DOCUMENTS 6,428,093 B1   8/2002  Farmont et al.
7,144,077 B2   12/2006 Grimm et al.
(Continued)

FOREIGN PATENT DOCUMENTS

DE        10023314 C1    8/2001
DE    102006050852 A1    5/2008
(Continued)

OTHER PUBLICATIONS

Farber, "Vehicle Sliding Roof Device Having Two Adjustable Covers", Feb. 10, 2014, Edition:W02014154383A3 (Year: 2014).*
(Continued)

*Primary Examiner* — Dennis H Pedder
*Assistant Examiner* — Joyce Eileen Hill
(74) *Attorney, Agent, or Firm* — Fitch, Even, Tabin & Flannery, LLP

(57) ABSTRACT

An assembly for a vehicle roof cover, wherein the cover can be moved from a closed position for closing a roof opening into an open position for at least partially releasing the roof opening. The assembly may have: a cover carrier for carrying the cover, a positionally fixed guide rail, and a carriage mounted so as to be displaceable in the guide rail along an opening direction. The cover carrier has a positionally fixed slotted guide to which the carriage may be coupled in the closed position, such that a deployment of the cover along a vertical direction (Z direction) is blocked in the closed position. The cover carrier has a locking apparatus configured so that a movement of the cover carrier along the (Continued)

vertical direction (Z direction) is limited in the closed position.

8 Claims, 5 Drawing Sheets

(51) Int. Cl.
*B60J 7/185* (2006.01)
*B60J 7/19* (2006.01)

(58) Field of Classification Search
USPC ....... 296/216.1, 2, 3, 4, 5, 8, 221, 222, 223, 296/224
See application file for complete search history.

(56) References Cited

U.S. PATENT DOCUMENTS

| | | |
|---|---|---|
| 8,727,432 B2 | 5/2014 | Yoshida |
| 8,807,646 B2 | 8/2014 | Grimm et al. |
| 9,902,244 B2 | 2/2018 | Hölzel |
| 9,975,409 B2 | 5/2018 | Hölzel |
| 9,981,536 B2 | 5/2018 | Hölzel |
| 10,106,020 B2 | 10/2018 | Hölzel |
| 10,792,986 B2 | 10/2020 | Knöpfle et al. |

FOREIGN PATENT DOCUMENTS

| | | |
|---|---|---|
| DE | 102011018151 A1 | 10/2012 |
| DE | 102014109698 B3 | 10/2015 |
| DE | 102014110234 B3 | 11/2015 |
| DE | 102014110626 A1 | 11/2015 |
| DE | 102014111539 A1 | 11/2015 |
| DE | 102014014174 A1 | 3/2016 |
| DE | 102017106510 A1 | 9/2018 |
| EP | 0965469 A2 | 12/1999 |
| EP | 1561620 A2 | 8/2005 |
| EP | 2559576 A1 | 2/2013 |
| JP | 2013-226963 A | 11/2013 |
| WO | WO-2014154383 A3 * | 12/2014 ................ B60J 7/19 |

OTHER PUBLICATIONS

International Search Report for PCT/EP2019/064492 dated Sep. 17, 2019 in English and German (6 pages).
Written Opinion of the ISA for PCT/EP2019/064492 dated Sep. 17, 2019 in German with English machine translation (8 pages).

\* cited by examiner

ASSEMBLY FOR A COVER OF A VEHICLE ROOF, AND VEHICLE ROOF FOR A MOTOR VEHICLE

CROSS-REFERENCE TO RELATED APPLICATIONS

This application is a U.S. national phase application filed under 35 U.S.C. § 371 of International Application No. PCT/EP2019/064492, filed 4 Jun. 2019, designating the United States, which claims priority from German Patent Application No. 10 2018 113 991.8, filed 12 Jun. 2018, which are hereby incorporated herein by reference in their entirety for all purposes.

FIELD

The invention relates to an assembly for a cover of a vehicle roof, wherein the cover can be moved over a stationary roof element from a closed position for closing a roof opening into an open position for at least partially releasing the roof opening. The invention also relates to a vehicle roof having such an assembly.

BACKGROUND

Assemblies with a movable cover for a vehicle roof are widely known from the prior art. Such assemblies are embodied for example as spoiler roofs, as described in DE 2011 018 151 A1. In the so-called spoiler roofs, a deployment lever is initially deployed at a rear, with respect to an opening direction, edge of the cover in order to raise the rear edge of the cover. The cover is then displaced relative to the deployment lever along the opening direction. The deployment lever is in this case held in place relative to the rest of the vehicle roof and is not displaced in the opening direction. This is different for example from so-called externally guided sliding roofs, in which the deployment lever at the rear edge of the cover is at least partially displaced, together with the cover, relative to the rest of the vehicle roof along the opening direction.

It is desirable to specify a concept for an assembly with a cover for a vehicle roof, said concept being distinguished by a reliable construction.

SUMMARY

According to the invention, an assembly for a cover of a vehicle roof is disclosed, wherein the cover can be moved over a stationary roof element, in particular a vehicle roof, from a closed position for closing a roof opening into an open position for at least partially freeing the roof opening. The assembly has a cover carrier for carrying the cover. The assembly has a positionally fixed guide rail. The assembly has a carriage which is mounted so as to be displaceable in the guide rail along an opening direction and which can be coupled to a drive in order to move the cover carrier. The cover carrier has a positionally fixed slotted guide to which the carriage is coupled in the closed position, such that a deployment of the cover along a vertical direction is blocked in the closed position. The cover carrier has a locking apparatus which is configured in such a way that a movement of the cover carrier along the vertical direction is limited in the closed position.

With roof opening closed, that is to say in the closed position of the cover carrier or cover, the load absorption/blocking in the vertical direction of the cover is typically substantially effected via the slotted guide connection between the positionally fixed cover carrier slotted guide and the carriage. This connection is generally sufficient for customary use loads. However, it has been recognized that in the event of damage, for instance crash loads as in the case of a vehicle accident, considerably higher forces act in the vertical direction on the cover and the cover carrier. As a result, the connection would be broken, and thus there would be a raising and loss of the connection of the cover to the roof or the corresponding mechanism.

According to the invention, in addition to the above-described slotted guide connection in the vertical direction, an additional locking apparatus is provided which, at least in the closed position of the cover carrier or cover, provides an additional securing action in the vertical direction. In particular in the event of damage, for instance a crash situation such as a pole crash, the locking apparatus acts as a bypass and increases the load absorption capacity. As a result, the cover carrier or cover can be held in position in a particularly satisfactory manner.

The locking apparatus is for example only active if a predetermined deformation of the assembly, in particular of the cover carrier and/or of a cover attached to the cover carrier, has taken place.

The locking apparatus also contributes to the properties of the overall system not being influenced during customary operation. The locking apparatus also makes it possible, in the case of overload, for there to be a direct conduction of load from the cover or cover carrier to the guide rail and thus the vehicle body. Furthermore, the additional locking can be realized within a given trim portion of the cover carrier, in particular without additional material outlay.

The cover is typically assembled on the cover carrier, such that a movement of the cover carrier corresponds to a movement of the cover. The closed position of the cover carrier consequently corresponds to a closed position of the cover. The cover is moved into the open position along the opening direction. The opening direction is for example parallel to the vehicle longitudinal direction. The closed position is the position in which the cover completely closes a roof opening in the vehicle roof.

It is the case here and in the following text that location indications or directional indications used, such as "behind" or "in front", are made in relation to the vehicle longitudinal direction. The vehicle longitudinal direction can also be referred to as horizontal direction. The deployment or raising of the cover or cover carrier takes place substantially in a vertical direction or Z direction, which runs substantially perpendicularly with respect to the X direction or vehicle longitudinal direction. The front end of the cover carrier is understood to mean for example the region which faces toward a vehicle front when the assembly is in the properly assembled state.

In a typical operation for opening the cover from the closed position, the carriage (also drive carriage) is displaced toward the rear along the opening direction. Initially, the cover carrier is deployed in the Z direction at the rear end and thus at the rear edge of the cover. For this purpose, a rear raising mechanism is provided. A movement of the cover carrier in the X direction is blocked or at least does not yet take place. This intermediate position is referred to as ventilation position. A front raising mechanism then couples to the carriage upon further displacement of same, such that the cover carrier is raised, for instance deployed, in the region of the front end and/or carried along toward the rear in the X direction. To this end, the locking of the front raising mechanism with respect to the X direction is released, for example. In this case, the cover is displaced over the roof element which is fixed to the vehicle, which means that the cover, after the raising or deployment in the region of a rear edge of the cover, that is to say in the region of a rear end of the cover carrier, is pushed over an outer side of the roof element which is fixed to the vehicle.

The roof element which is fixed to the vehicle is for example a positionally fixed transparent element, for instance a glass cover, or alternatively a part of the roof body, for instance the vehicle roof or the like. The assembly is for example an assembly for a spoiler roof.

By way of example, in the closed position, the assembly is locked such that, in addition to the locking in the Z direction, a movement of the cover carrier in the X direction is also blocked or locked. In the closed position, the cover completely closes a roof opening of the vehicle.

The positionally fixed slotted guide of the cover carrier cannot be moved relative thereto but can be moved relative to the guide rail and the carriage. The guide rail is positionally fixed with respect to a vehicle or vehicle roof in a properly assembled state. The coupling of the carriage to the positionally fixed slotted guide of the cover carrier in the closed position is realized for example via a coupling element of the carriage, for instance a slider.

According to one embodiment, the locking apparatus is configured to limit the movement of the cover carrier as a result of a positively locking interaction with the carriage. In other words, a form fit is configured, which comes into effect in the closed position, in particular after predetermined deformation, and locks the movement in the Z direction.

According to one embodiment, in the closed position, the locking apparatus surrounds the carriage in a contactless positively locking manner, in particular on an underside of the carriage, said underside facing away from the cover carrier. As a result, for limitation purposes, the locking apparatus strikes against the underside of the carriage, in particular if the cover carrier would intend to detach from the vehicle, and prevents a further movement of the cover carrier.

According to one embodiment, in the closed position, the locking apparatus dips through a cutout or an aperture in the guide rail in order to surround the carriage in a contactless positively locking manner. It is consequently necessary merely to introduce a cutout into the guide rail, the locking apparatus being able to dip through said cutout in the closed position for example in order to engage around the carriage from below, as described above.

According to one embodiment, the locking apparatus can be moved relative to the carriage and is configured such that, after the carriage has been displaced from the closed position, a movement of the cover carrier in the vertical direction is enabled. In other words, during the opening operation, the carriage moves out of the locking apparatus, such that a deployment of the cover at the front edge is also enabled, for example. In this case, it is also necessary for the slotted guide connection of the positionally fixed slotted guide of the cover carrier to correspondingly permit a Z movement.

According to one embodiment, the locking apparatus is formed by a locking hook. In other words, an additional interlocking is formed. The hook interlocks with the carriage in order to prevent or limit the movement of the cover carrier in the Z direction.

According to one embodiment, the locking apparatus is formed by a sheet-metal insert.

According to one embodiment, the positionally fixed slotted guide and the locking apparatus are arranged in the region of a front end of the cover carrier.

A vehicle roof for a motor vehicle is also disclosed, said roof having a roof opening, an assembly according to one of the preceding embodiments, which is coupled to the vehicle roof, and also a cover which is fixedly coupled to the cover carrier of the assembly. The assembly is configured, by means of the cover, to completely close the roof opening in the closed position or to at least partially free said roof opening.

The vehicle roof substantially facilitates the abovementioned advantages and functions.

One exemplary embodiment is described below with the aid of the appended figures. Elements or features of identical construction or function are provided with the same reference designations throughout the figures. Elements or features which have already been described with the aid of reference designations are not necessarily provided with reference designations in all of the figures.

BRIEF DESCRIPTIONS OF THE DRAWINGS

DETAILED DESCRIPTION

Figure 1:
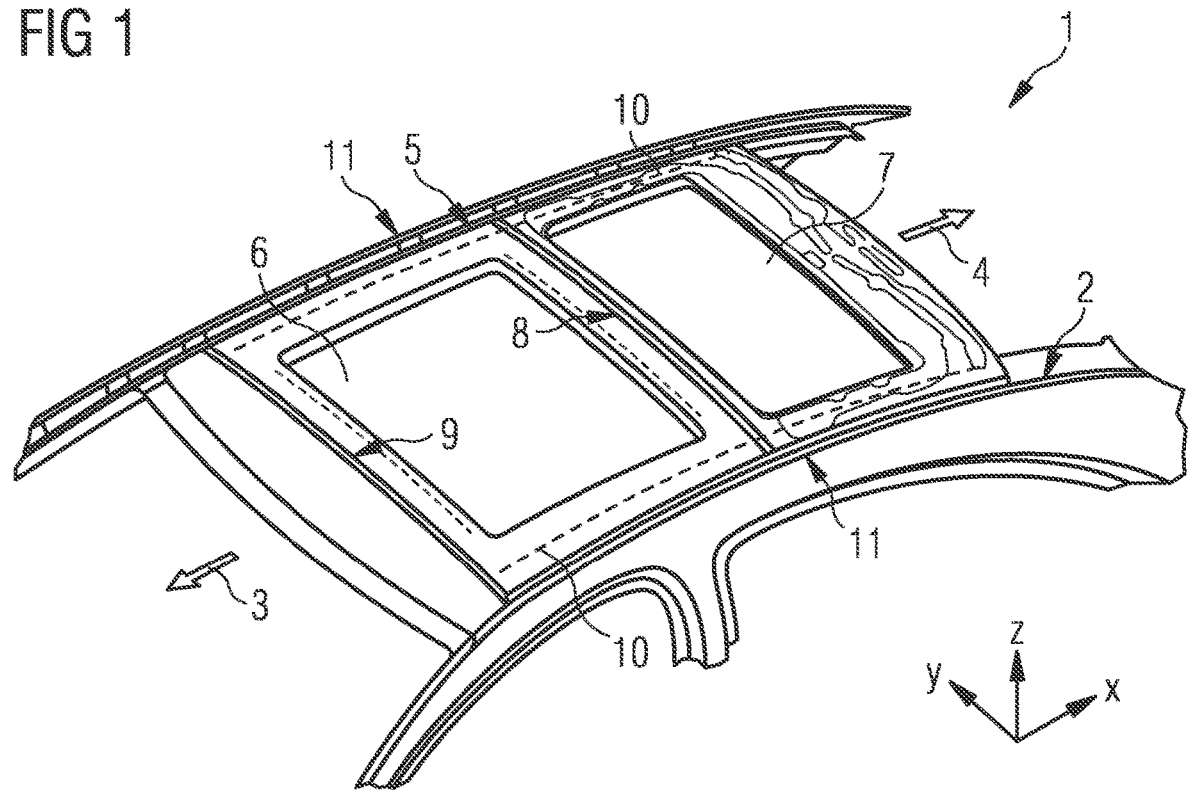
FIG. 1 shows a schematic, perspective view of a vehicle.

FIG. 1 shows a motor vehicle 1 with a vehicle roof 2 in a schematic, perspective view. A vehicle longitudinal direction 3 points in the direction of the windshield or in the direction of a vehicle front. From the vehicle front, the vehicle roof 2 extends toward the rear along an opening direction 4 (X direction, see coordinate system). The vehicle roof 2 has a roof opening 5 which, in FIG. 1, is completely closed by a first (transparent) cover 6 and a second (transparent) cover 7. The cover 6, which is also referred to as front cover, can be moved relative to the vehicle roof 2 toward the rear along the opening direction 4, such that the roof opening 5 can be at least partially freed. The second cover 7 should be understood to be a stationary roof element and is fixedly connected to the vehicle roof 2. As an alternative, the second cover 7 can also be a part of the vehicle roof, for instance of the metallic roof panel, itself or else a movable cover. The first cover 6 should be viewed as part of a sliding roof, with this being a spoiler roof. By way of example, the covers 6, 7 are glass covers of a so-called panoramic sliding roof.

By means of an assembly 11 which is described below, the first cover 6 is initially raised (deployed) at a rear edge 8 from the closed position which is shown in FIG. 1 and in which said cover terminates flush with the vehicle roof and the second cover 7. This is referred to as ventilation position. The first cover 6 is then displaced toward the rear over the second cover 7 until it reaches an open position. Here, a front edge 9 of the first cover 6 is also raised.

The assembly 11 comprises two guide rails 10 (indicated schematically by dashed lines) which are arranged on both sides and in which, inter alia, the first cover 6 is supported in a displaceable manner. A displacement in a guide rail 10 or parallel thereto is substantially synonymous with the opening direction 4. The guide rails 10 are positionally fixed with respect to the vehicle roof 2.

One exemplary embodiment of an assembly 11 for moving and deploying the first cover 6 is described below. Since the assembly 11 comprises components which are arranged on both sides, such as the guide rails 10, only one longitudinal side of the vehicle 1 is described. The assembly 11 can also be referred to as a sliding roof or deployment apparatus. Furthermore, it should be noted that the first cover 6 is fixedly connected to a cover carrier. A displacement or movement of the first cover 6 is therefore synonymous with a movement of the cover carrier.

FIGS. 1 to 7 in each case illustrate a Cartesian coordinate system. In this case, the X direction can also be referred to as horizontal direction and corresponds to the opening direction 4. The Z direction can also be referred to as vertical direction.

Figure 2:
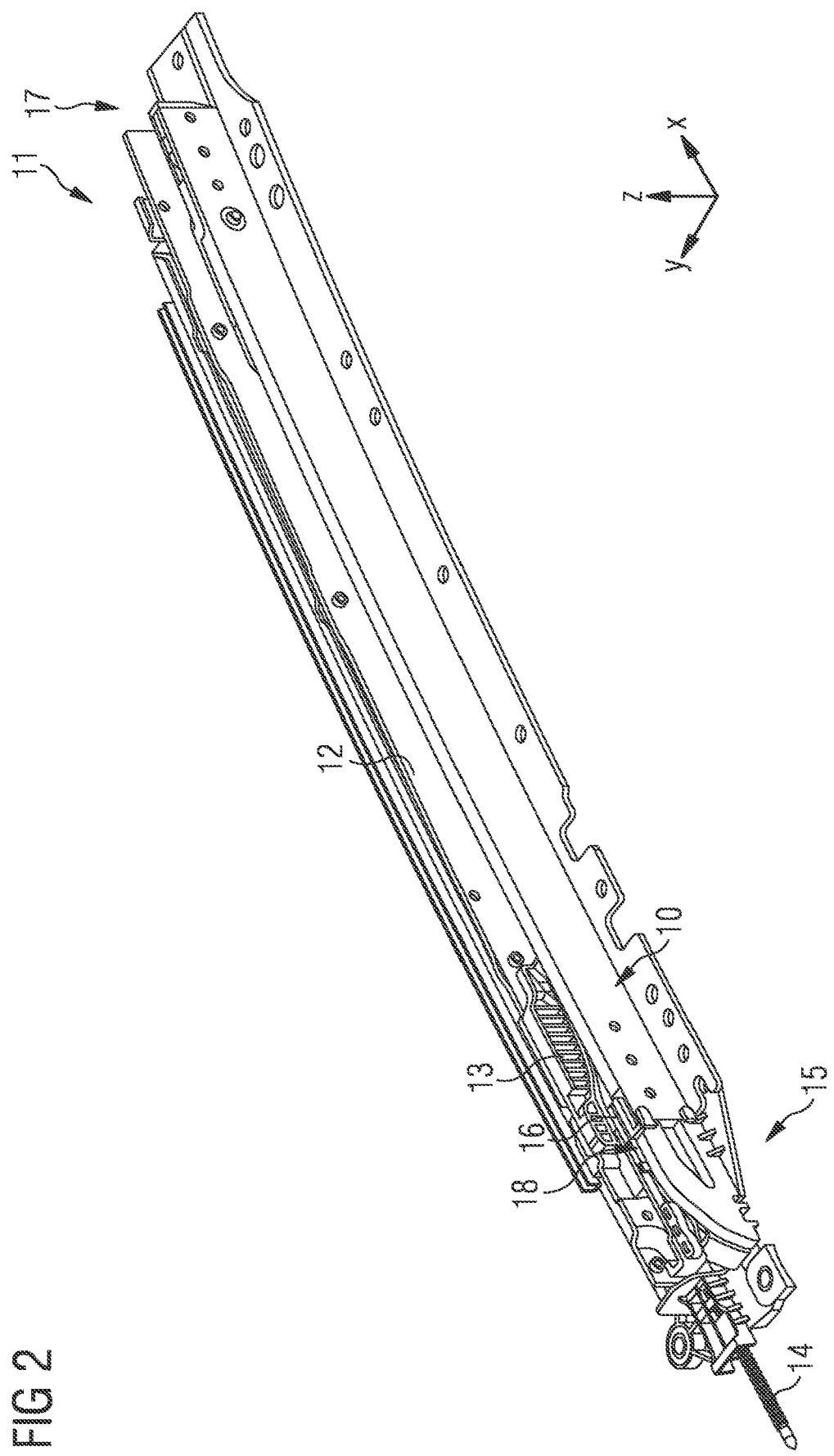
FIG. 2 shows a schematic, perspective side view of an assembly with a cover carrier for a vehicle roof of the vehicle.

FIG. 2 illustrates an assembly 11. The assembly 11 comprises a guide rail 10 and a cover carrier 12, which is fixedly connected to the front cover 6 in the proper operational state. Furthermore, a carriage 18 (also drive carriage) is illustrated, which is guided in a displaceable manner in the guide rail 10 and can be actuated by means of a drive in conjunction with a drive cable 14 which is generally rigid in compression. In the region of a front end 15 of the assembly 10, said front end facing toward the cover front edge 9, the cover carrier 12 has a positionally fixed slotted guide 13. In other words, the positionally fixed slotted guide 13 cannot be moved relative to the cover carrier 12. The positionally fixed slotted guide 13 can be an integral part of the cover carrier 12. The carriage 18 has a coupling element 16 which, in the closed position, shown in FIG. 1, of the front cover 6, is in engagement with the positionally fixed slotted guide 13 of the cover carrier 12. In the closed position of the front cover 6, the positionally fixed slotted guide 13 serves as a Z locking means of the cover 6 or cover carrier 12. In other words, a movement of the cover carrier 12 in the Z direction is blocked.

Further details of the assembly 11, for instance in the region of the front end 15 and a rear end 17 for the deployment and carrying-along of the front cover 6 by the carriage 18 during the opening operation described above, are not relevant for the understanding of the present invention and are therefore not described. By way of example, reference is made to the Applicant's already published documents DE 102014111539 A1, DE 102014110234 A1, DE 102014109698 A1 or DE 102014110626 A1 for exemplary, non-limiting configurations of the assembly.

Below, reference is made to the front end 15 of the assembly 11 in the closed position of the front cover 6.

Figure 3:
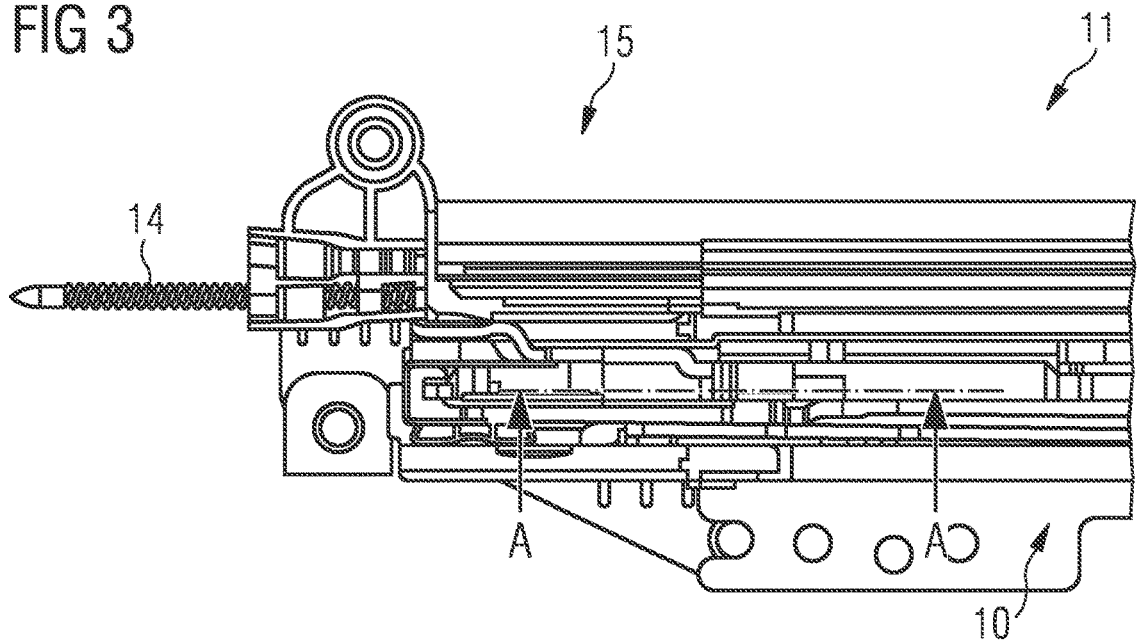
FIG. 3 shows a plan view of the assembly in a front region.
Figure 4:
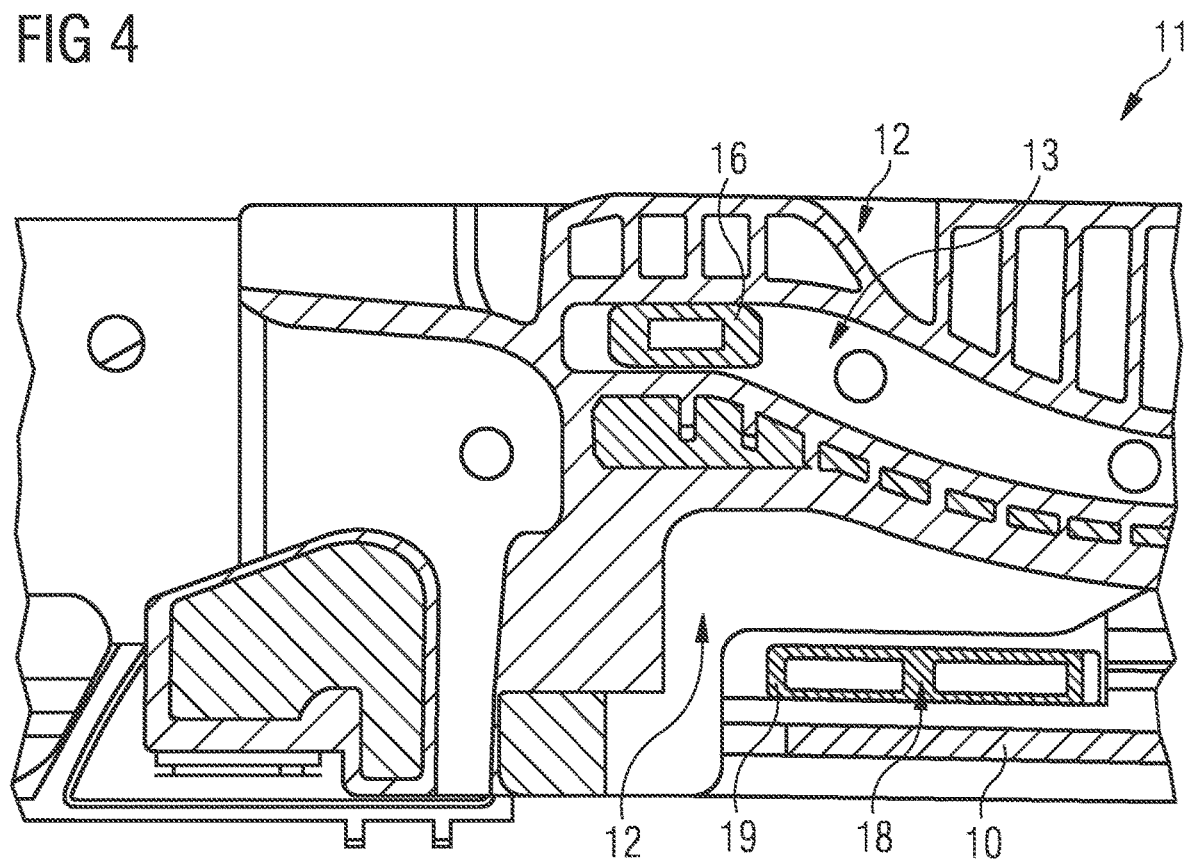
FIG. 4 shows a schematic sectional view of an assembly.

FIG. 3 shows a plan view of the front end 15 of the assembly 11, a section profile A-A having been drawn in said plan view. The associated sectional view is shown in FIG. 4. In the closed position of the front cover 6 or of the cover carrier 12, the coupling element 16 of the carriage 18 is in engagement with the slotted guide 13, such that a deployment of the cover carrier 12 in the Z direction is prevented. The carriage 18 comprises one or more carriage sliders 19, by means of which the carriage 18 is mounted in the guide rail 10 in a displaceable manner.

Figure 5:
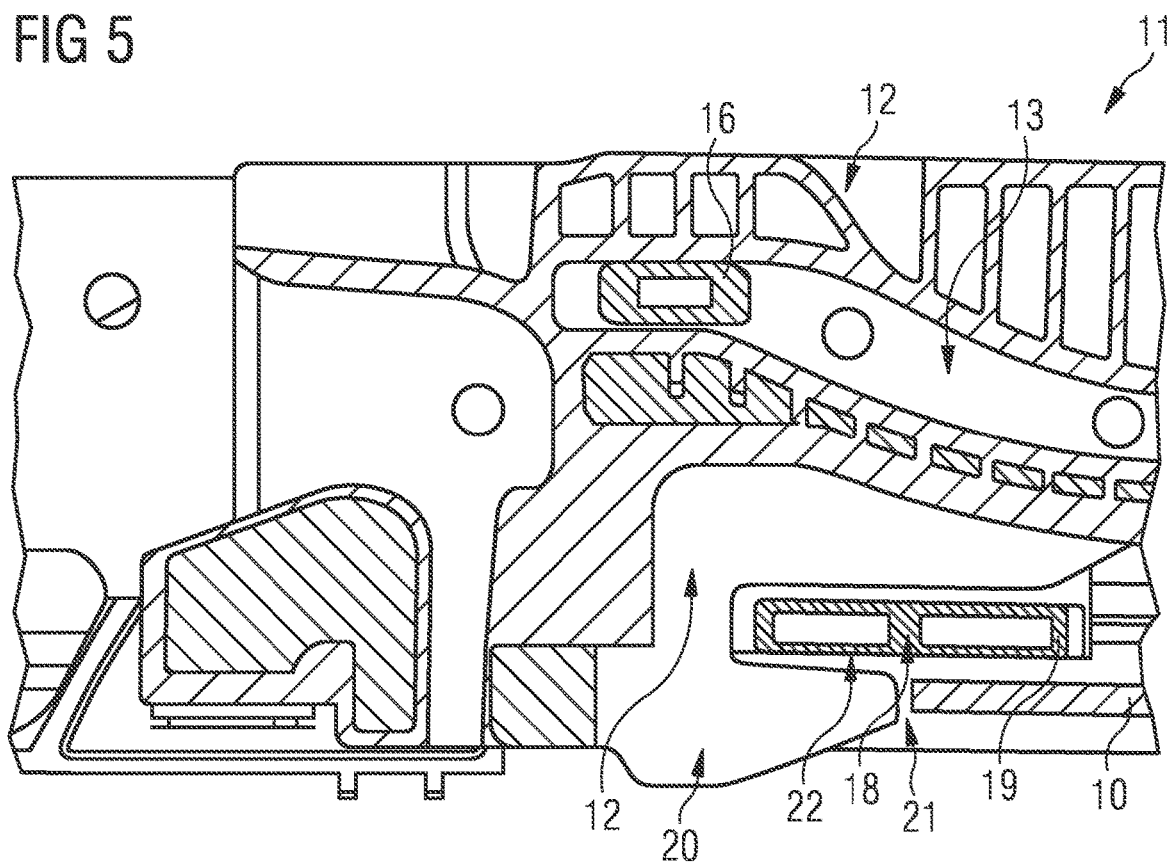
FIGS. 5 to 7 show schematic sectional views of an assembly in three different states according to one exemplary embodiment of the invention.
Figure 6:
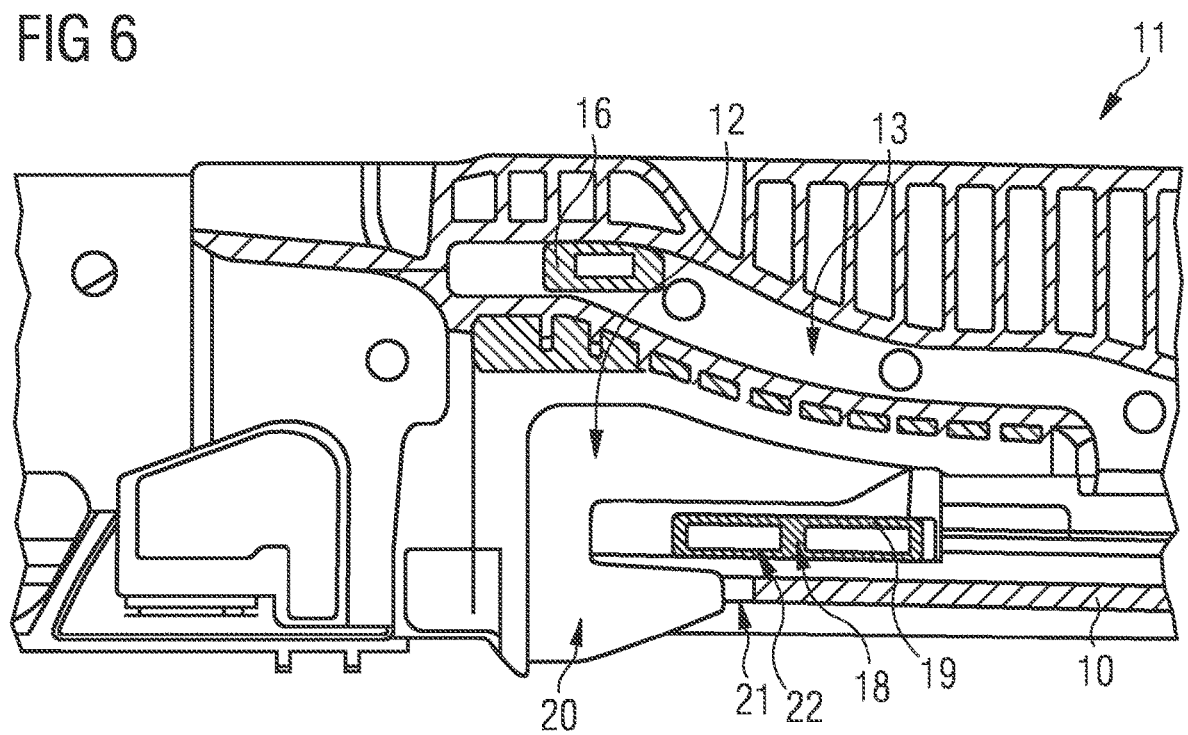
Figure 7:
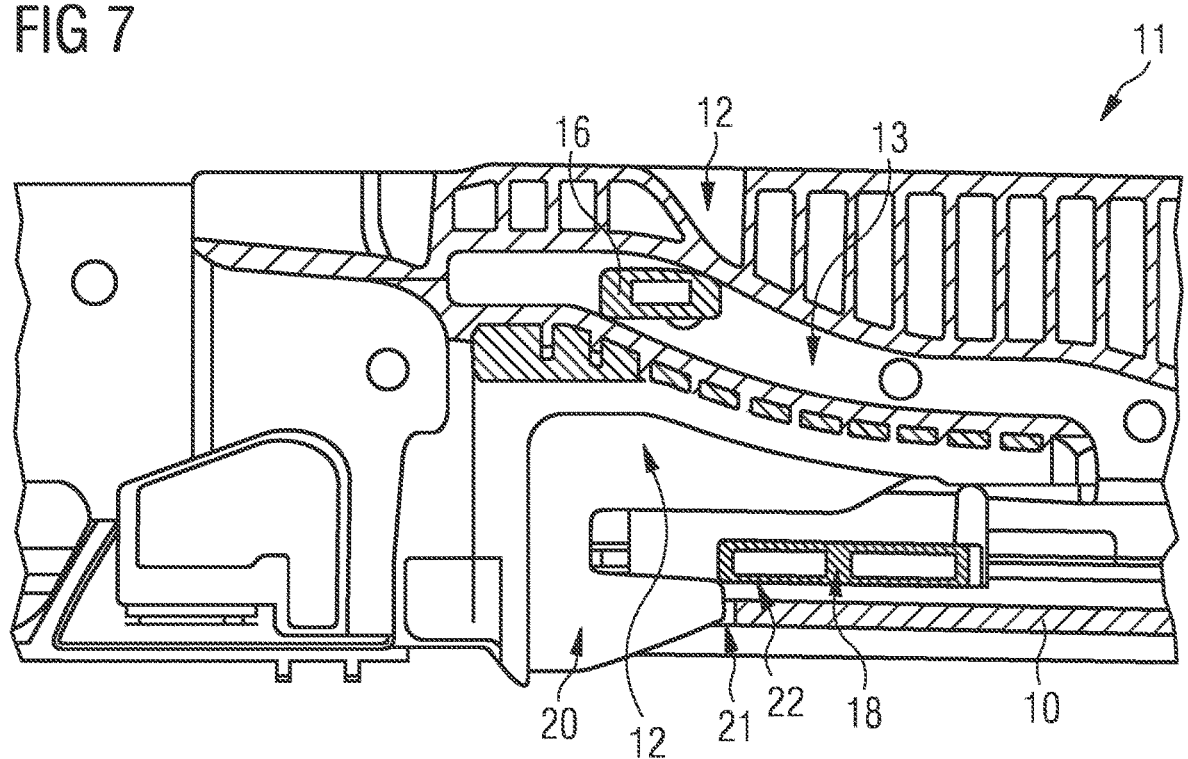

FIGS. 5 to 7 show an assembly 11 according to one exemplary embodiment of the invention in three operational states. The assembly 11 substantially corresponds to the above-described assembly according to FIGS. 3 and 4, wherein the cover carrier 12 has an additional locking apparatus 20 in the form of a locking hook. The locking apparatus 20 is configured in the form of a sheet-metal insert and is fixedly connected to the cover carrier 12. The locking apparatus 20 is an integral part of the cover carrier 12 or is fixedly coupled to the cover carrier 12 as a separate element.

FIG. 5 shows the closed position of the cover carrier 12. In addition to the above-described Z locking by means of the slotted guide 13 and the coupling element 16, the locking apparatus 20 provides an additional Z locking in the closed position, at least in the event of damage after a predetermined deformation of the assembly 11, in particular of the front cover 6 or of the cover carrier 12.

The locking apparatus 20 dips through a cutout 21 in the guide rail 10 and is configured such that the locking apparatus 20 surrounds the carriage 18 on an underside 22 in a contactless positively locking manner. In the event of damage, for instance if the front cover 6 or the cover carrier 12 would intend to detach from the vehicle 1 or vehicle roof 2, the locking apparatus 20 limits a movement of the cover carrier 12 in the vertical direction (Z direction). As a result, the advantages and functions mentioned in the introduction are provided.

FIGS. 6 and 7 show states of the assembly 11 in which the carriage has moved out of the closed position in the opening direction 4. It can be seen that the carriage 18 can be moved relative to the locking apparatus 20, such that, after the carriage 18 has been displaced from the closed position, a movement of the cover carrier 12 in the vertical direction is enabled (see FIG. 7). For this purpose, the locking apparatus 20 is accordingly configured in a corresponding manner. Expressed differently, the cover carrier 12 is not yet carried along toward the rear in the X direction or opening direction 4 by the movement of the carriage 18 in this initial movement portion for opening the front cover 6, such that the carriage 18 is released from the positively locking embrace.

The invention claimed is:

1. An assembly for a cover of a vehicle roof,
   wherein the cover is movable over a stationary vehicle roof element from a closed position for closing a roof opening into an open position for at least partially freeing the roof opening, the cover having
   a cover carrier for carrying the cover,
   a positionally fixed guide rail,
   a carriage which is mounted so as to be displaceable in the guide rail along an opening direction and which can be coupled to a drive to move the cover carrier,
   wherein the cover carrier has a positionally fixed slotted guide to which the carriage is coupled in the closed position, such that a deployment of the cover along a vertical direction is blocked in the closed position;
   the cover carrier having a locking apparatus which is configured in such a way that a movement of the cover carrier along the vertical direction is limited in the closed position;
   wherein, in the closed position, the locking apparatus covers the carriage from above and below in a contactless positively locking manner.

2. The assembly according to claim 1, wherein the locking apparatus is configured to limit the movement of the cover carrier as a result of a positively locking interaction with the carriage.

3. The assembly according to claim 1, wherein, in the closed position, the locking apparatus dips through a cutout in the guide rail.

4. The assembly according to claim 1, wherein the carriage is movable relative to the locking apparatus, such that, after the carriage has been displaced from the closed position, a movement of the cover carrier in the vertical direction is enabled.

5. The assembly according to claim 1, wherein the locking apparatus is formed by a locking hook.

6. The assembly according to claim 1, wherein the locking apparatus is formed by a sheet-metal insert.

7. The assembly according to claim 1, wherein the positionally fixed slotted guide and the locking apparatus are arranged in the region of a front end of the cover carrier.

8. A vehicle roof for a motor vehicle, having a roof opening, an assembly according to claim 1, which is coupled to the vehicle roof, and also a cover which is fixedly coupled to the cover carrier of the assembly, wherein the assembly is configured, by means of the cover, to completely close the roof opening in the closed position or to at least partially free said roof opening.

* * * * *